United States Patent
Abd Elhamid et al.

(10) Patent No.: US 9,246,178 B2
(45) Date of Patent: Jan. 26, 2016

(54) METHOD TO MINIMIZE THE IMPACT OF SHUNT CURRENTS THROUGH AQUEOUS BASED COOLANTS ON PEM FUEL CELL BIPOLAR PLATES

(75) Inventors: Mahmoud H. Abd Elhamid, Grosse Pointe Woods, MI (US); Youssef M. Mikhail, Sterling Heights, MI (US); Gayatri Vyas Dadheech, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1229 days.

(21) Appl. No.: 12/194,859

(22) Filed: Aug. 20, 2008

(65) Prior Publication Data

US 2010/0047647 A1    Feb. 25, 2010

(51) Int. Cl.
*H01M 8/04* (2006.01)
*H01M 8/02* (2006.01)
*H01M 8/24* (2006.01)

(52) U.S. Cl.
CPC .......... *H01M 8/0232* (2013.01); *H01M 8/0206* (2013.01); *H01M 8/0228* (2013.01); *H01M 8/0267* (2013.01); *H01M 8/04074* (2013.01); *H01M 8/241* (2013.01); *Y02E 60/50* (2013.01)

(58) Field of Classification Search
CPC .................................................... H01M 8/0206
USPC .......................... 429/434, 437, 453, 456, 457
See application file for complete search history.

(56) References Cited

U.S. PATENT DOCUMENTS

| 6,699,593 | B2* | 3/2004 | Kaneta et al. ................. 428/670 |
| 6,790,554 | B2* | 9/2004 | May et al. ...................... 429/414 |
| 7,344,798 | B2 | 3/2008 | Vyas et al. |
| 7,935,456 | B2* | 5/2011 | Leonida ......................... 429/514 |
| 2002/0058177 | A1* | 5/2002 | Nishiyama et al. ............. 429/35 |
| 2004/0115513 | A1* | 6/2004 | Yang ............................... 429/38 |
| 2004/0166393 | A1* | 8/2004 | Akita et al. ..................... 429/38 |
| 2005/0003259 | A1* | 1/2005 | Forderer et al. ................ 429/34 |
| 2008/0124597 | A1* | 5/2008 | Murata et al. ................... 429/26 |

FOREIGN PATENT DOCUMENTS

DE    11 2004 002166 T5    9/2006

* cited by examiner

*Primary Examiner* — Vickie Kim
*Assistant Examiner* — Peter Keyworth
(74) *Attorney, Agent, or Firm* — Brooks Kushman P.C.

(57) ABSTRACT

A fuel cell includes a first valve metal flow field plate. The first valve metal flow field plate has a first cooling channel adapted to receive an aqueous coolant and to contact the aqueous coolant at a position that inhibits the formation of shunt currents when the fuel cell is incorporated in a fuel cell stack. A field assembly includes a first metal flow field plate having a first cooling channel adapted to receive an aqueous coolant is also provided. A valve metal plate is disposed over the first metal flow field plate in the flow field assembly. Fuel cell stacks using the valve metal-containing flow field plates are also provided.

24 Claims, 3 Drawing Sheets

METHOD TO MINIMIZE THE IMPACT OF SHUNT CURRENTS THROUGH AQUEOUS BASED COOLANTS ON PEM FUEL CELL BIPOLAR PLATES

BACKGROUND OF THE INVENTION

1. Field of the Invention

In at least one embodiment, the present invention is related to bipolar plates used in PEM fuel cells.

2. Background Art

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. The anode and cathode layers of a typical PEM fuel cell are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote oxidation of hydrogen at the anode and reduction of oxygen at the cathode. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The electrically conductive plates currently used in fuel cells provide a number of opportunities for improving fuel cell performance. For example, these metallic plates typically include a passive oxide film on their surfaces requiring electrically conductive coatings to minimize the contact resistance. Such electrically conductive coatings include gold and polymeric carbon coatings. Typically, these coatings require expensive equipment that adds to the cost of the finished bipolar plate. Moreover, metallic bipolar plates are also subjected to corrosion during operation. Degradation mechanism includes the release of fluoride ions from the polymeric electrolyte. Metal dissolution of the bipolar plates typically results in release of iron, chromium and nickel ions in various oxidation states.

The efficiency of PEM fuel cell is reduced by wet end shunt currents flowing through the coolant. Such shunt currents depend on the ionic conductivity of, and the potential drop across, the aqueous based coolant. A slight change in coolant conductivity can lead to a significant shunt current which can then damage the wet end plate if it is made of materials that are prone to corrosion, such as stainless steels. This shunt current is mainly due to oxygen evolution on the wet end coolant port area and hydrogen evolution on the dry end plate.

For water management, it is desirable for metal bipolar plates to have a low contact angle at the bipolar plate/water border; that is, a contact angle less than 40°. Titanium nitride coatings have been proposed as corrosion-resistant plating for bipolar plates. Although titanium nitride coatings are cost-effective, such coatings do not provide satisfactory protection for the bipolar plate material. Further, titanium nitride coatings develop relatively low water affinity with a contact angle close to 60°

Accordingly, there is a need for improved methodology for lowering the contact resistance at the surfaces of bipolar plates used in fuel cell applications.

SUMMARY OF THE INVENTION

The present invention solves one or more problems of the prior art by providing in at least one embodiment a fuel cell with improved corrosion resistance. The fuel cell includes a first valve metal flow field plate. The first valve metal flow field plate has a first cooling channel adapted to receive an aqueous coolant and to contact the aqueous coolant at a position that inhibits the formation of shunt currents when the fuel cell is incorporated in a fuel cell stack. The present embodiment utilizes valve metals that are more corrosion resistant than stainless steels. These metals build thick oxide films that can protect the metal underneath from further attack by the environment and can tolerate higher voltages than stainless steels. According to the current invention a thin sheet of a valve metal preferably titanium will be used near the wet end of the stack. This sheet will still have coolant and gas port areas similar to those on regular stainless steel bipolar plates. If the header area of the valve metal sheet is completely passivated, the shunt current can still flow between the dry end and the stainless steel plate that is in contact with the titanium flat sheet; current will always flow in the direction that has the least resistance. In order to avoid this problem, a thin layer of a noble metal will be coated on the coolant port area of the valve metal sheet. This allows for the shunt current to flow between the dry end stainless steel coolant port area and the coolant port area for noble metal coated titanium sheet.

In another embodiment, a flow field assembly includes a first metal flow field plate having a first cooling channel adapted to receive an aqueous coolant. In this embodiment, a valve metal plate is disposed over the first metal flow field plate.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Figure 1:
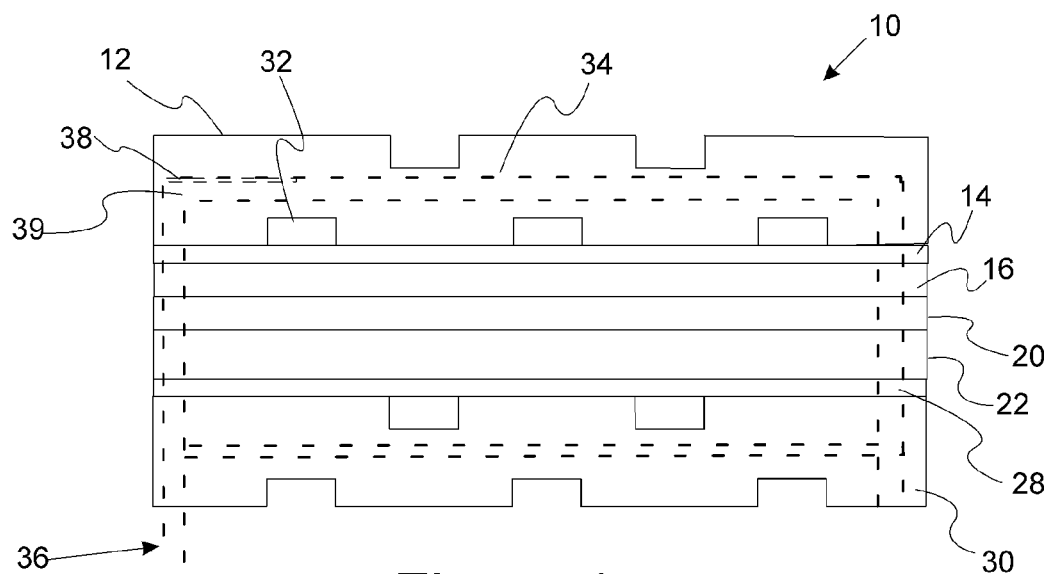
FIG. 1 provides a schematic side view of a fuel cell having a flow field plate made from a valve metal.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application where publications are referenced, the disclosures of these publications in their entireties are hereby incorporated by reference into this application to more fully describe the state of the art to which this invention pertains.

In an exemplary embodiment, a fuel cell having a flow field plate with improved corrosion resistance is provided. The flow field plate of this embodiment includes a cooling channel through which an aqueous coolant flows. The flow field plate comprises a valve metal, which contacts the aqueous coolant at a position that inhibits the formation of shunt currents when the fuel cell is incorporated into a fuel cell stack.

With reference to FIG. 1, a fuel cell comprising a valve metal flow field plate is provided. Fuel cell 10 includes flow field plate 12 which is partially or completely made from a valve metal or alloy thereof. Examples of suitable valve metals include, but are not limited to, titanium, tantalum, niobium, and alloys thereof. Flow field plate 12 includes a plurality of channels 32 for introducing a first gas into fuel cell 10. Typically, this first gas is comprises oxygen. Titanium is found to be particularly useful. Diffusion layer 14 is disposed over flow field plate 12. First catalyst layer 16 is disposed over diffusion layer 14. Fuel cell 10 further includes ion conductor layer 20 which is disposed over first catalyst layer 16. Second catalyst layer 22 is disposed over ion conductor layer 20. Fuel cell 10 also includes flow field plate 30 with gas diffusion layer 28 interposed between second catalyst layer 22 and flow field plate 30. In a refinement, flow field plate 30 is made from a metal such as stainless steel.

Still referring to FIG. 1, flow field plate 12 includes cooling channel 34, which forms part of cooling system 36. At least a portion of flow field plate 12 is coated with precious metal layer 38, which comprises a precious metal. In a refinement, the thickness of precious metal layer 38 is from about 5 to 50 nm. Examples of suitable precious metals include, but are not limited to, platinum, gold, and combinations thereof. In a refinement, flow field plate 12 is substantially completely coated with precious metal layer 38. In another refinement, flow field plate 12 is coated such that the thickness of precious metal layer 38 is thicker (e.g, 10-50 nm) in the vicinity of inlet port 39. The remaining areas in this refinement, may be coated with a thickness of about 1 to 10 nm.

Figure 2:
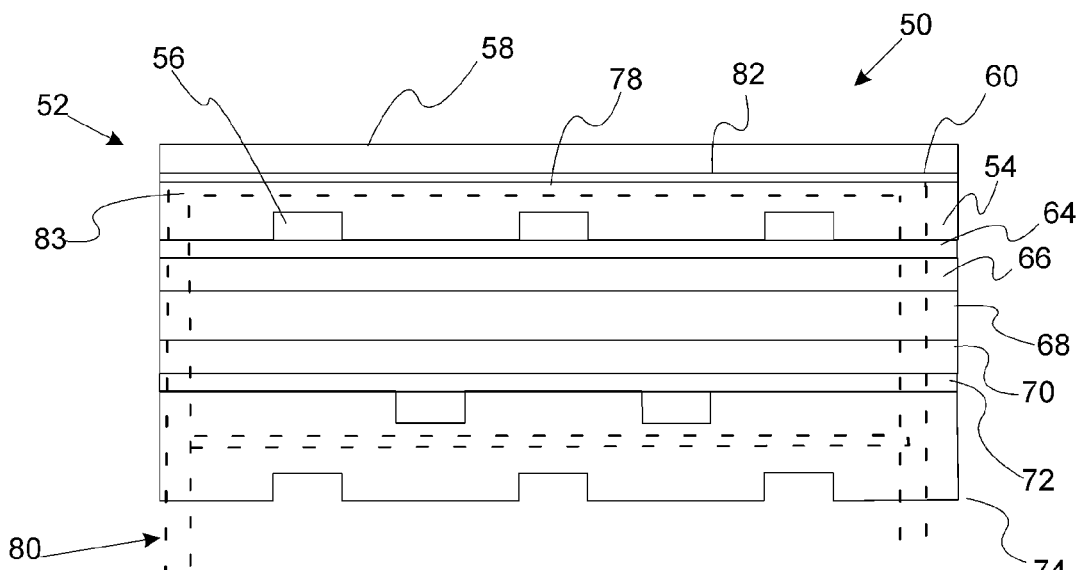
FIG. 2 provides a schematic side view of a fuel cell having a flow field plate assembly that includes a plate made a valve metal.

With reference to FIG. 2, a fuel cell comprising a flow field assembly having a valve metal plate is provided. Fuel cell 50 includes flow field assembly 52. Flow field assembly includes flow field plate 54, which includes a plurality of channels 56 for introducing a first gas to fuel cell 50. Typically, the first gas includes oxygen. Flow field assembly 52 further includes valve metal plate 58. Diffusion layer 64 is disposed over flow field plate 54. First catalyst layer 66 is disposed over diffusion layer 64. Fuel cell 50 further includes ion conductor layer 68, which is disposed over first catalyst layer 66. Second catalyst layer 70 is disposed over ion conductor layer 68. Fuel cell 50 also includes flow field plate 70 with gas diffusion layer 72 interposed between second catalyst layer 70 and flow field plate 74. In a refinement, flow field plate 74 is made from a metal such as stainless steel.

Still referring to FIG. 2, flow field assembly 52 includes cooling channel 78, which forms part of cooling system 80. The aqueous coolant contacts at least a portion of valve metal plate 58. In one refinement, at least of portion of cooling channel 78 is defined by valve metal plate 58. Cooling channel may be partially or completely defined by valve metal plate 58. In another refinement, at least a portion of valve metal plate 58 is coated with precious metal layer 82, which comprises a precious metal. In a refinement, the thickness of precious metal layer 82 is from about 5 to 50 nm. Examples of suitable precious metals include, but are not limited to, platinum, gold, and combinations thereof. In a refinement, valve metal plate 58 is substantially completely coated with precious metal layer 82. In another refinement, valve metal plate 58 coated with precious metal layer 82 only in the vicinity of inlet port 83 of cooling channel 78.

Figure 3:
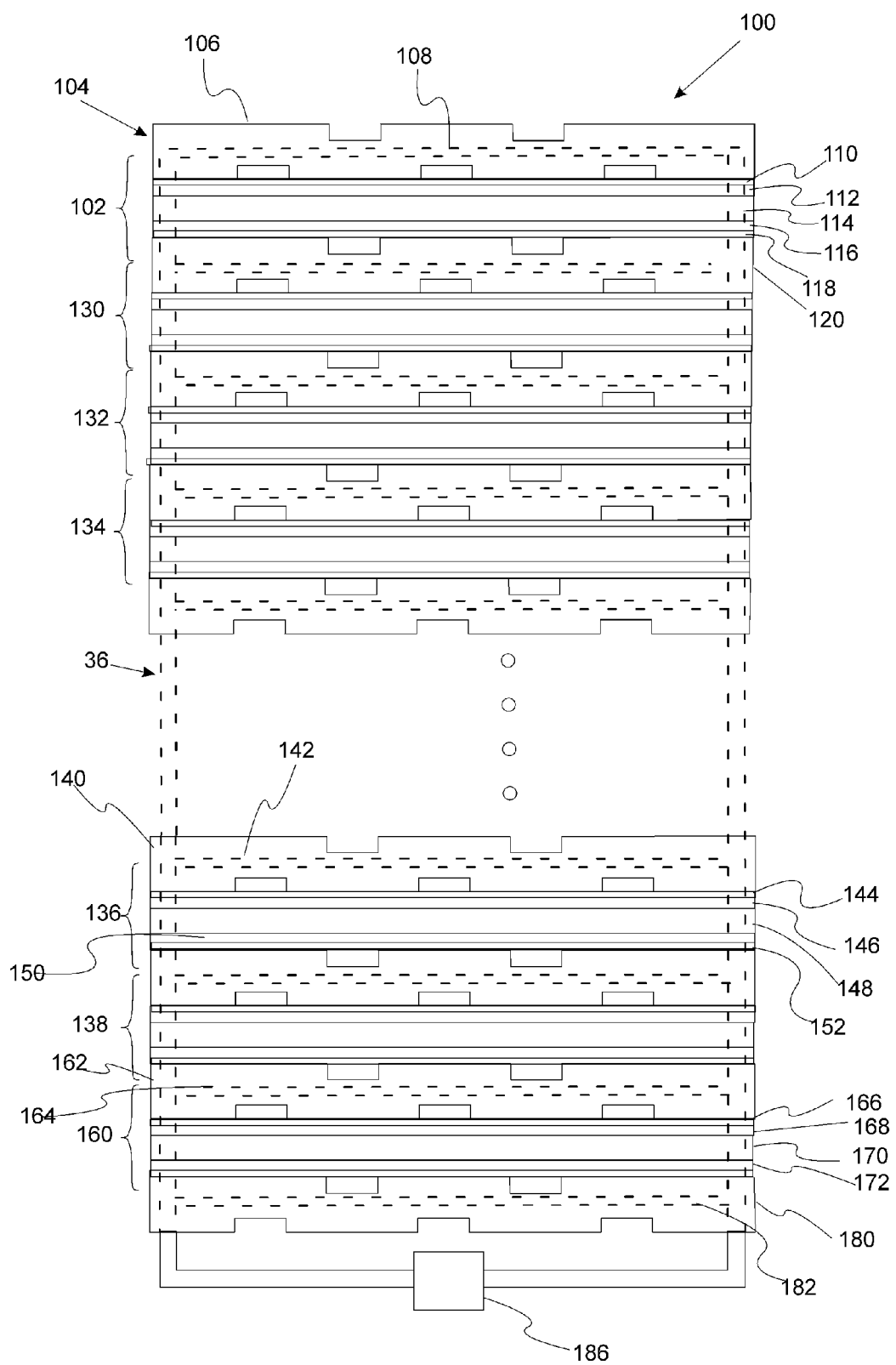
FIG. 3 is a schematic illustration of a fuel cell using the fuel cell of FIG. 1A.

With reference to FIG. 3, a schematic of a fuel cell stack including a plurality of fuel cells is provided. Fuel cell stacks in current used typically have from about 10 to 200 individual fuel cells. Fuel cell stack 100 includes first fuel cell 102 which is of the general design of the fuel cell depicted in FIG. 1. As such, first fuel cell 102 includes first end plate assembly 104 which includes flow field plate 106. Flow field plate 106 comprises a valve metal as set forth above. In an exemplary variation, flow field plate 106 is made from titanium. First end plate assembly 104 includes first end plate cooling channel 108 that contacts the valve metal. Fuel cell 102 includes gas diffusion layer 110 and first catalyst layer 112. First catalyst layer 112 is disposed over gas diffusion layer 110. Fuel cell 102 also includes first ion conductor layer 114 and second catalyst layer 116. First ion conductor layer 114 is disposed over first catalyst layer 112 while second catalyst layer 116 is disposed over the first ion conductor layer 114. Fuel cell 102 also includes gas diffusion layer 118 which is disposed over second catalyst layer 116. Gas diffusion layer 118 is adjacent to first bipolar plate 120, which is also part of fuel cell 130.

Fuel cell stack 100 also includes a plurality of intermediate fuel cell assemblies 130-138. Each intermediate fuel cell includes intermediate fuel cell bipolar plate 140 which also is part of an adjacent fuel cell assembly. Intermediate fuel cell bipolar plate 140 includes intermediate cooling channel 142 and first intermediate diffusion layer 144. First intermediate diffusion layer 144 is disposed over intermediate fuel cell bipolar plate 140. Fuel cell 136 also includes first intermediate catalyst layer 146, which is positioned over first intermediate diffusion layer 144. Fuel cell ion conductor layer 148 is positioned between first intermediate catalyst layer 146 and second intermediate catalyst layer 150 with second intermediate diffusion layer 152 being disposed over second intermediate catalyst layer 150.

Still referring to FIG. 3, fuel cell stack 100 also includes last fuel cell assembly 160. Last fuel cell 160 includes last bipolar plate 162 which is also part of an adjacent fuel cell assembly. Bipolar plate 162 includes last bipolar plate cooling channel 164. Last fuel cell 160 also includes first diffusion layer 166 and first catalyst layer 168. First diffusion layer 166 is disposed over last bipolar plate 162 while first catalyst layer 168 is disposed over first diffusion layer 166. Fuel cell 160 also includes last ion conductor layer 170, second catalyst layer 172, and second diffusion layer 174. Ion conductor layer 170 is disposed over first catalyst layer 168 with second catalyst layer 172 being disposed between ion conductor layer 170 and second diffusion layer 174. Fuel cell 160 includes last end plate 180 which includes last end plate cooling channel 182.

Still referring to FIG. 3, fuel cell stack 100 also includes cooling system 36 which is in communication with the first end plate cooling channel, intermediate bipolar plate cooling channel(s), the last bipolar plate cooling channel, and the last end plate cooling channel. Cooling system 36 includes recirculation system 186 for providing aqueous coolant to fuel cell stack 100.

Figure 4:
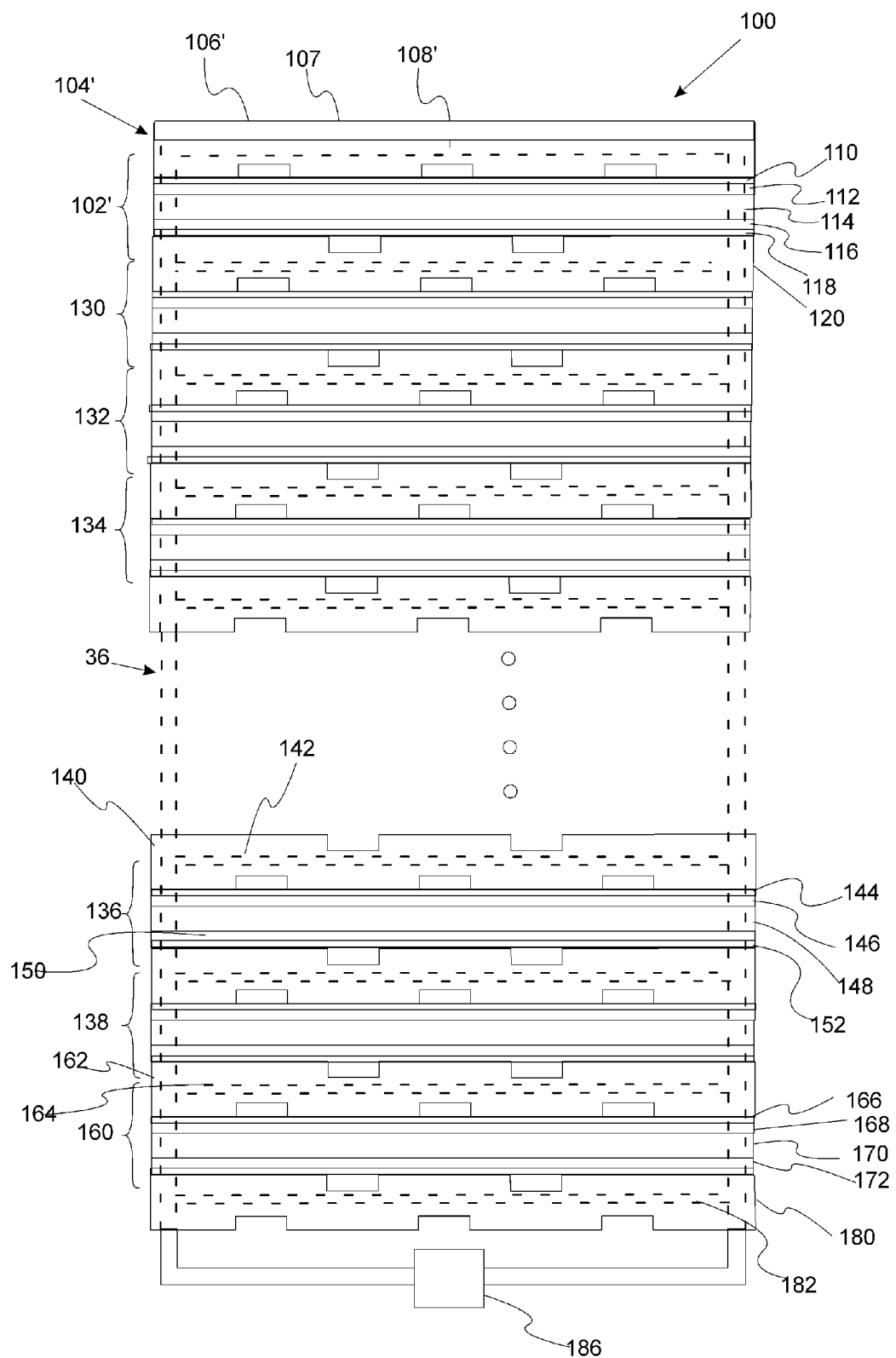
FIG. 4 is a schematic illustration of a fuel cell using the fuel cell of FIG. 2.

With reference to FIG. 4, a schematic of a fuel cell stack including a plurality of fuel cells is provided. Fuel cell stacks in current use typically have from about 10 to 200 individual fuel cells. Fuel cell stack 100' includes first fuel cell 102' which is of the general design of the fuel cell depicted in FIG. 2. As such, first fuel cell 102' includes first end plate assembly 104' which includes flow field plate 106' and valve metal plate 107, which comprises a valve metal as set forth above. First end plate assembly 104' includes first end plate cooling channel 108' that contacts the valve metal. Fuel cell 102' includes gas diffusion layer 110 and first catalyst layer 112. First catalyst layer 112 is disposed over gas diffusion layer 110. Fuel cell 102 also includes first ion conductor layer 114 and second catalyst layer 116. First ion conductor layer 114 is disposed over first catalyst layer 112 while second catalyst layer 116 is disposed over the first ion conductor layer 114. Fuel cell 102' also includes gas diffusion layer 118 which is disposed over second catalyst layer 116. Gas diffusion layer 118 is adjacent to first bipolar plate 120, which is also part of fuel cell 130.

Fuel cell stack 100' also includes a plurality of intermediate fuel cell assemblies 130-138. Each intermediate fuel cell includes intermediate fuel cell bipolar plate 140 which also is part of an adjacent fuel cell assembly. Intermediate fuel cell bipolar plate 140 includes intermediate cooling channel 142 and first intermediate diffusion layer 144. First intermediate diffusion layer 144 is disposed over intermediate fuel cell bipolar plate 140. Fuel cell 136 also includes first intermediate catalyst layer 146, which is positioned over first intermediate diffusion layer 144. Fuel cell ion conductor layer 148 is positioned between first intermediate catalyst layer 146 and second intermediate catalyst layer 150, with second intermediate diffusion layer 152 being disposed over second intermediate catalyst layer 150.

Still referring to FIG. 4, fuel cell stack 100' also includes last fuel cell assembly 160. Last fuel cell 160 includes last bipolar plate 162 which is also part of an adjacent fuel cell assembly. Bipolar plate 162 includes last bipolar plate cooling channel 164. Last fuel cell 160 also includes first diffusion layer 166 and first catalyst layer 168. First diffusion layer 166 is disposed over last bipolar plate 162 while first catalyst layer 168 is disposed over first diffusion layer 166. Fuel cell 160 also includes last ion conductor layer 170, second catalyst layer 172, and second diffusion layer 174. Ion conductor layer 170 is disposed over first catalyst layer 168 with second catalyst layer 172 being disposed between ion conductor layer 170 and second diffusion layer 174. Fuel cell 160 includes last end plate 180 which includes last end plate cooling channel 182.

Still referring to FIG. 4, fuel cell stack 100' also includes cooling system 36 which in communication with the first end plate cooling channel, intermediate bipolar plate cooling channel(s), the last bipolar plate cooling channel, and the last end plate cooling channel. Cooling system 36 includes recirculation system 186 for providing aqueous coolant to fuel cell stack 100'.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A fuel cell for inclusion in a fuel cell stack having a wet end, the fuel cell comprising:
    a first valve metal flow field plate, the first valve metal flow field plate adapted to be positioned at the wet end of the fuel cell stack, the first valve metal flow field plate having a first cooling channel adapted to receive an aqueous coolant and an inlet port;
    a precious metal layer disposed over a portion of the first valve metal flow field plate only in the vicinity of the inlet port;
    a first catalyst layer disposed over the first valve metal flow field plate;
    a first ion conductor layer disposed over the first catalyst layer;
    a second catalyst layer disposed over the first ion conductor layer; and a second flow field plate disposed over the second catalyst layer, the second flow field plate comprising stainless steel.

2. The fuel cell of claim 1 wherein the valve metal is selected from the group consisting of titanium, tantalum, niobium, and alloys thereof.

3. The fuel cell of claim 1 wherein the valve metal is titanium.

4. The fuel cell of claim 1 wherein the first valve metal flow field plate contacts the aqueous coolant at a position proximate to an entrance to the first cooling channel.

5. The fuel cell of claim 1 wherein the precious metal layer includes a precious metal selected from the group consisting of platinum, palladium, gold, and combinations thereof.

6. The fuel cell of claim 5 wherein the precious metal is gold.

7. The fuel cell of claim 1 wherein the precious metal layer has a thickness of 5 to 50 nm.

8. A fuel cell stack comprising the fuel cell of claim 1.

9. A fuel cell for inclusion in a fuel cell stack having a wet end, the fuel cell comprising:
 a first metal flow field plate, the first metal flow field plate having a first cooling channel adapted to receive an aqueous coolant and an inlet port;
 a valve metal plate disposed over the first metal flow field plate, the valve metal plate adapted to be positioned at the wet end of a fuel cell stack;
 a precious metal layer disposed over a portion of the valve metal plate only in the vicinity of the inlet port;
 a first catalyst layer disposed over the valve metal plate;
 a first ion conductor layer disposed over the first catalyst layer;
 a second catalyst layer disposed over the first ion conductor layer; and
 a second flow field plate disposed over the second catalyst layer.

10. The fuel cell of claim 9 wherein the valve metal is selected from the group consisting of titanium, tantalum, niobium, and alloys thereof.

11. The fuel cell of claim 9 wherein the valve metal is titanium.

12. The fuel cell of claim 9 wherein the precious metal layer includes a precious metal selected from the group consisting of platinum, palladium, gold, and combinations thereof.

13. The fuel cell of claim 12 wherein the precious metal is gold.

14. The fuel cell of claim 9 wherein the precious metal layer has a thickness of 5 to 50 nm.

15. The fuel cell of claim 9 wherein the valve metal plate contacts the aqueous coolant at a position proximate to an entrance to the first cooling channel.

16. A fuel cell stack comprising the fuel cell of claim 9.

17. A fuel cell stack having a wet end, the fuel cell stack comprising:
 a first fuel cell assembly comprising:
  a first end plate assembly comprising a valve metal, the first end plate assembly adapted to be positioned at the wet end of the fuel cell stack and having a first end plate cooling channel and an inlet port;
  a precious metal layer disposed over a portion of the valve metal only in the vicinity of the inlet port;
  a first diffusion layer disposed over the first end plate assembly;
  a first catalyst layer disposed over the first diffusion layer;
  a first ion conductor layer disposed over the first catalyst layer;
  a second catalyst layer disposed over the first ion conductor layer;
  a second diffusion layer disposed over the second catalyst layer; and
  a first bipolar plate disposed over the second diffusion layer;
 a plurality of intermediate fuel cell assemblies, each intermediate fuel cell comprising:
  a first intermediate fuel cell bipolar plate;
  a first intermediate diffusion layer disposed over the first intermediate fuel cell bipolar plate;
  a first intermediate catalyst layer disposed over the first intermediate diffusion layer;
  a intermediate fuel cell ion conductor layer disposed over the first intermediate catalyst layer;
  a second intermediate catalyst layer disposed over the intermediate fuel cell ion conductor layer;
  a second intermediate diffusion layer disposed over the second intermediate catalyst layer; and
  a second intermediate fuel cell bipolar plate disposed over the second diffusion layer,
 a last fuel cell assembly comprising:
  a last bipolar plate;
  a first last cell diffusion layer disposed over the last bipolar plate;
  a first last cell catalyst layer disposed over the first diffusion layer;
  a last ion conductor layer disposed over the first diffusion layer;
  a second last cell catalyst layer disposed over the last ion conductor layer;
  a second last cell diffusion layer disposed over the second catalyst layer; and
  a last end plate disposed over the second diffusion layer, the last end plate having a last end plate cooling channel; and
 a cooling system in communication with the first end plate cooling channel and the last end plate cooling channel.

18. The fuel cell stack of claim 17 wherein the valve metal is selected from the group consisting of titanium, tantalum, niobium, and alloys thereof.

19. The fuel cell stack of claim 17 wherein the precious metal layer has a thickness of 5 to 50 nm.

20. The fuel cell stack of claim 17 wherein the precious metal layer comprises a component selected from the group consisting of platinum, palladium, gold, and combinations thereof.

21. The fuel cell stack claim 17 wherein the first end plate assembly comprises a flow field plate.

22. The fuel cell stack of claim 21 wherein the flow field plate comprises the valve metal.

23. The fuel cell stack of claim 22 wherein the first end plate assembly comprises a valve metal plate contacting the flow field plate.

24. The fuel cell stack of claim 17 wherein the cooling system provides an aqueous coolant to the first end plate cooling channel, intermediate bipolar plate cooling channel (s), the last end plate cooling channel, and the last end plate cooling channel.

* * * * *